US008651964B2

(12) United States Patent
Brick (10) Patent No.: US 8,651,964 B2
(45) Date of Patent: Feb. 18, 2014

(54) ADVANCED VIDEO CONTROLLER SYSTEM

(75) Inventor: Todd A. Brick, West Point, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 2205 days.

(21) Appl. No.: 11/313,050

(22) Filed: Dec. 20, 2005

(65) Prior Publication Data

US 2006/0258454 A1 Nov. 16, 2006

Related U.S. Application Data

(60) Provisional application No. 60/678,959, filed on Apr. 29, 2005.

(51) Int. Cl.
*A63F 9/00* (2006.01)

(52) U.S. Cl.
USPC ........... 463/50; 463/2; 463/5; 463/36; 463/37

(58) Field of Classification Search
USPC ............. 463/42, 1–6, 7, 8, 30, 36, 37; 434/11
See application file for complete search history.

(56) References Cited

U.S. PATENT DOCUMENTS

| | | | |
|---|---|---|---|
| 4,144,568 A | 3/1979 | Hiller et al. | |
| 5,047,860 A | 9/1991 | Rogalski | |
| 5,524,637 A | 6/1996 | Erickson | |
| 5,793,359 A | 8/1998 | Ushikubo | |
| 5,825,350 A | 10/1998 | Case, Jr. et al. | |
| 5,976,083 A | 11/1999 | Richardson et al. | |
| 5,989,157 A | 11/1999 | Walton | |
| 6,545,661 B1 | 4/2003 | Goschy et al. | |
| 6,569,019 B2 | 5/2003 | Cochran | |
| 6,590,536 B1 | 7/2003 | Walton | |
| 6,641,482 B2 | 11/2003 | Masuyama et al. | |
| 6,672,962 B1 | 1/2004 | Ozaki et al. | |
| 6,700,499 B2 | 3/2004 | Kubo et al. | |
| 6,834,436 B2 | 12/2004 | Townsend et al. | |
| 6,878,066 B2 | 4/2005 | Leifer et al. | |
| 6,902,483 B2 * | 6/2005 | Lin | 463/37 |
| 7,223,173 B2 | 5/2007 | Masuyama et al. | |
| 2002/0010021 A1 * | 1/2002 | McCauley | 463/37 |
| 2002/0072416 A1 * | 6/2002 | Ohshima | 463/43 |

(Continued)

OTHER PUBLICATIONS

Thomas B, Close B, Donoghue J, Squires J, Bondi PD, Piekarski W (2002) First person indoor/outdoor augmented reality application: ARQuake. Pers Ubiquitous Comput 6:75-86.*

(Continued)

*Primary Examiner* — David L Lewis
*Assistant Examiner* — Ross Williams
(74) *Attorney, Agent, or Firm* — Michael K. Gray (57) ABSTRACT

A video control system has an accelerometer sensor connected to a microcontroller for imparting motion and orientation information to the microcontroller. An encoder/transmitter is connected to the microcontroller and converts a plurality of parallel signals from the microcontroller into a serial data stream which is wirelessly transmitted to a receiver/decoder which converts the serial data back to the original parallel signals. The receiver/decoder is connected to a keyboard encoder that is connected to the keyboard port of personal computer. The accelerometer sensor, microcontroller and encoder transmitter are adapted to be worn on a video player's person. The system allows for a realistic experience in a video environment in which movement of the video player is replicated and appreciated on a video screen.

4 Claims, 9 Drawing Sheets

(56) References Cited

U.S. PATENT DOCUMENTS

| | | |
|---|---|---|
| 2003/0022716 A1 | 1/2003 | Park et al. |
| 2004/0121292 A1* | 6/2004 | Chung et al. .................. 434/11 |
| 2005/0044186 A1* | 2/2005 | Petrisor ........................ 709/219 |
| 2005/0130739 A1* | 6/2005 | Argentar ......................... 463/36 |
| 2005/0246109 A1 | 11/2005 | Bang et al. |
| 2009/0131759 A1* | 5/2009 | Sims et al. .................. 600/301 |

OTHER PUBLICATIONS

Mark A. Livingston, Lawrence J. Rosenblum, Simon J. Julier, Dennis Brown, Yohan Baillot, J. Edward, Swan Ii, Joseph L. Gabbard, Deborah Hix "An Augmented Reality System for Military Operations in Urban Terrain" In Interservice/Industry Training, Simulation, and Education Conference http://home.earthlink.net/~ed.bass/papers/o_IITSEC02.pdf.*

Knerr, B. W., Garrity, P. J., & Lampton, D. R. (Dec. 2004). Embedded training for Future Force Warriors: An assessment of wearable virtual simulators. Paper presented at the 24th Army Science Conference, Orlando, FL.*

"Custom VR Systems" dated Feb. 13, 2003, Retrieved from http://web.archiveorg/web/20030213062555/http://www.vrimmersions.com/systems.htm, Retrieved on May 23, 2007.*

Lukowicz et al, "WearNET: A Distributed Multi-sensor System for Context Aware Wearable", 2002.*

Mark A. Livingston, Lawrence J. Rosenblum, Simon J. Julier, Dennis Brown, Yohan Baillot, J. Edward, Swan Ii, Joseph L. Gabbard, Deborah Hix "An Augmented Reality System for Military Operations in Urban Terrain" In Interservice/Industry Training, Simulation, and Education Conference http://home.earthlink.net/~ed.bass/papers/o_IITSEC02.pdf Dec. 2002.*

Harvey Weinberg, "Using the ADXL202 Duty Cycle Output" pp. 1-6, AN-604 Application Note, Analog Devices, Norwood, MA (2002).

* cited by examiner

$$Acceleration\ (in\ g) = \frac{(T1/T2) - 50\%}{12.5\%}$$

Stand   Crouch   Prone

ADVANCED VIDEO CONTROLLER SYSTEM

BENEFIT OF PROVISIONAL APPLICATION

U.S. Provisional Application Ser. No. 60/678,959 filed on Apr. 29, 2005 is herein incorporated by reference, the benefits and priority of which are hereby claimed.

The invention described herein may be manufactured, used and licensed by or for the U.S. Government for governmental purposes without need of the U.S. Government paying royalties thereon.

BACKGROUND OF THE INVENTION

I. Field of the Invention

The present invention pertains to video game controllers. More particularly the present invention pertains to a video game control system where the actual physical motion and orientation of a player is replicated and appreciated in a video environment.

II. Discussion of the Background

Conventional video games, including first-person shooter games, utilize keyboards, mice and/or joysticks as the control mechanisms. These conventional devices are the tools which have allowed a player to control a conventional or typical on-screen, weapon-shooting character. Although these conventional controllers allow for control of the onscreen character, they fail to provide the user with a realistic experience.

As a result, so-called "virtual reality" games have been introduced which allow a user to experience realistic interaction with the gaming environment. However, virtual reality games require extensive and costly equipment and are generally not functional with home video systems and video displays. Still further, these virtual reality games do not replicate the actual dynamic motion of a player in the virtual world.

Thus, a need is demonstrated for an affordable video game control system that can replicate a user's body movement onscreen to allow the player to simulate a real world experience in a video environment.

SUMMARY OF THE INVENTION

Accordingly, one object of the present invention is to provide a video body control system that will allow a player's body movements to be automatically replicated on a video screen so that the perspective and orientation caused by this body movement is appreciated in the video environment.

Another object of the present invention is to incorporate a video weapon control system with the video body control system so that a video weapon can be handled, aimed and fired at a video target from a plurality of player positions.

Still another object of the present invention is to realize the above objects in an economical manner through the use of commercially available off-the-shelf components.

These and other valuable objects and advantages are realized by a video game controller system for a video game or any first-person shooter (FPS) that uses standard keyboard and mouse controls for movement and/or combat actions. In particular, a video game controller system is provided which replaces the traditional keyboard and mouse inputs. Movement and control of the game character is provided by sensors, which allow the critical functions of the game performed by a user player to be replicated in a video environment. The sensors are connected to a microcontroller that processes the respective sensor signals into digital signals. Through the use of an encoder/transmitter these digital signals are encoded and wirelessly transmitted via a serial data stream to a receiver/decoder. The receiver/decoder is connected to a keyboard encoder in connection with a main game or personal computer (PC).

With the advent of MEMS (Micro Electro-Mechanical Systems), accelerometers can detect static and dynamic acceleration in two axis up to 100 g's and with a resolution in the milli g's. The devices generate a pulse width modulated signal based on the instantaneous acceleration along an axis. The present invention utilizes such an accelerometer as a motion and orientation sensor that is worn on a user player's person for detecting the player's posture. Acceleration is the dot product of the gravity vector with the axis of measurement. Thus, an axis pointing to the ground gives an acceleration of g, while an axis parallel to the ground gives an acceleration of 0 g.

By orienting the two perpendicular axis of the accelerometer in a known fashion on the player, the accelerations and the pulse widths can be empirically derived and tested. A range of values for each orientation can be compared with the average value over a short time period.

Any dynamic acceleration causes fluctuations in the values of the axis over time. The maximum deviation between the extrema and the average can be compared to expected values for movement and jumping. The microcontroller according to the present invention uses interrupts on the rising and/or falling edges of the pulse width modulated (PWM) X and Y axis signals to record a free-running timer value. A rising to falling difference is used to compute the T1 time while a rising to rising difference gives the T2 time. These values are then inserted into a cyclical buffer for each axis. Between the interrupts, the microcontroller processor is free to execute the rest of the sensor code. The code runs in an infinite loop and calculates the averages, maximums or minimums. These values are used in a linear decision segment to determine orientation, movement, jumping, or state changes.

The bit-encoded control signals for crouch, prone, jump, move (from the motion orientation sensor) and bit-encoded control signals for forward, reverse, left and right (from sensors on a game weapon) are sent to a wireless transmission module. This module incorporates other binary signals such as fire, reload, fix jam, semi/auto, action and night vision. These parallel signals are multiplexed and encoded into a serial data stream and transmitted over the unlicensed ISM band of 418, 433, or 916 MHZ. The data receiver de-multiplexes the serial stream and regenerates the parallel control signals. These signals are connected to inputs of the keyboard encoder which in turn generates a standard PC keyboard scan code when an input is brought to ground level. Thus, the game software is unaware that a crouch command of "c" was generated by the player's physical orientation and not by a standard keyboard stroke.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
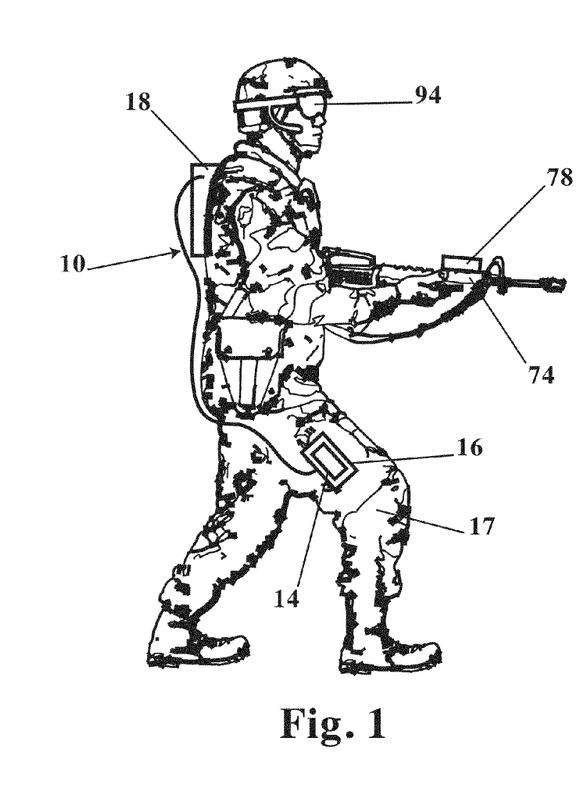
FIG. 1 is a perspective illustration of a human user player equipped with components of the present invention.

With reference to FIG. 1, a player 10 depicted as dressed in military fatigues is provided with a sensor 16 housed in a sensor container or housing 14. The sensor housing is attached to the side of the player's thigh 17. The sensor housing is made of plastic or other appropriate material and can be clipped to the player's trousers or attached by Velcro™ or attached by other suitable means. Player 10 is an actual, real, live human being who is an active participant in a video game.

Player 10 is further provided with a backpack 18 that contains video control components that will be subsequently elaborated upon. Player 10 holds a rifle or game weapon 74 having a two-axis gyroscopic look-aim sensor 78. A head mounted viewer display 94 allows the player 10 to view a video environment.

Figure 2:
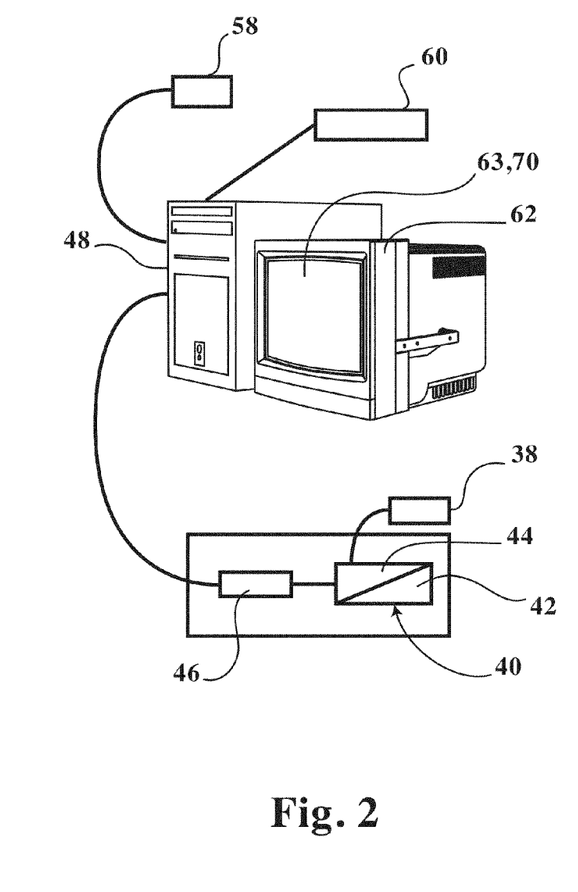
FIG. 2 is a schematic illustration of components which interface with a PC according to the present invention.

In FIG. 2, a personal computer (PC) 48 is connected to a keyboard encoder 46 which is connected to a data receiver/decoder 40 that has a receiving component 42 and a decoding component 44. A power source 38 connects to the data receiver/decoder 40. The computer 48 has a monitor 62 having a video screen 70 on which a video environment 63 containing targets 64 can be viewed. The same environment is viewed by the player through the head mounted viewer display 94. A receiver 58 for receiving signals from the look-aim sensor 78 is connected to computer 48. A transmitter 60 for transmitting audio visual data to a receiver contained in the backpack 18 of player 10 connects to computer 48 as well.

Figure 3:
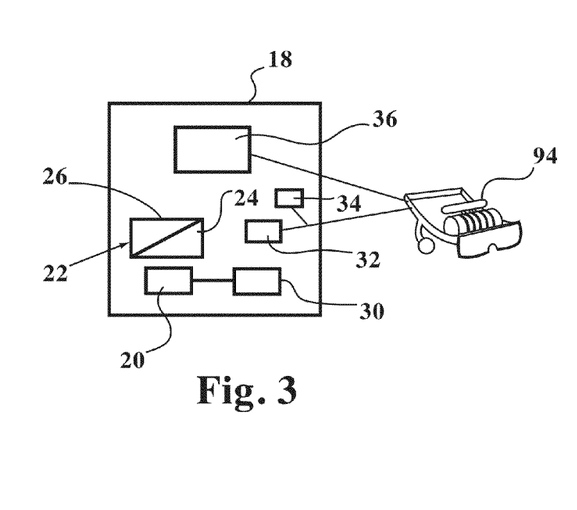
FIG. 3 is a schematic illustration of some of the components which are worn by a user player according to the present invention.

With reference to FIG. 3, the backpack 18 contains a number of components used in the video system of the invention. A microcontroller 20 is connected to an encoder/transmitter 22 that is provided with encoder components 24 and transmitter components 26. An audio visual receiver 36 receives AV signals from transmitter 60 (FIG. 2) and relays the signals to head mounted viewer display 94. A power source 30 connects to microcontroller 20 and a power source 32 connects to the head mounted viewer display 94. A voltage regulator 34 regulates the voltage supplied to the microcontroller 20 and head mounted viewer display 94.

Figure 4:
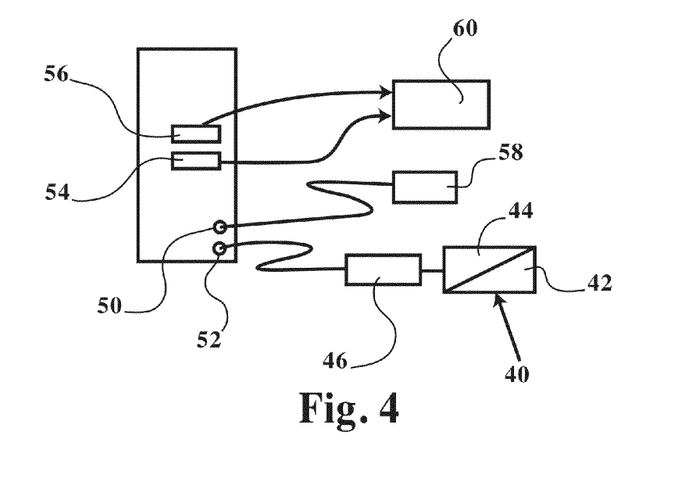
FIG. 4 is a schematic illustration showing how various components of the present invention are connected to a PC.

In FIG. 4, the computer 48 has its video card 54 and sound card 56 connected to transmitter 60. The mouse port 50 of computer 48 is connected to receiver 58 that receives data from the look-aim sensor 78 of game weapon 74. The keyboard port 52 of computer 48 is connected to keyboard encoder 46 which is connected to receiver/decoder 40. (Receiver/decoder 40 receives a data from encoder/transmitter 22). The transmission between transmitter 60 and AV receiver 36 is further visualized in FIG. 5 where video card 54 and sound card 56 connect to transmitter 60 which transmits the data to AV receiver 36 which sends the data to head mounted video display 94.

Figure 6:
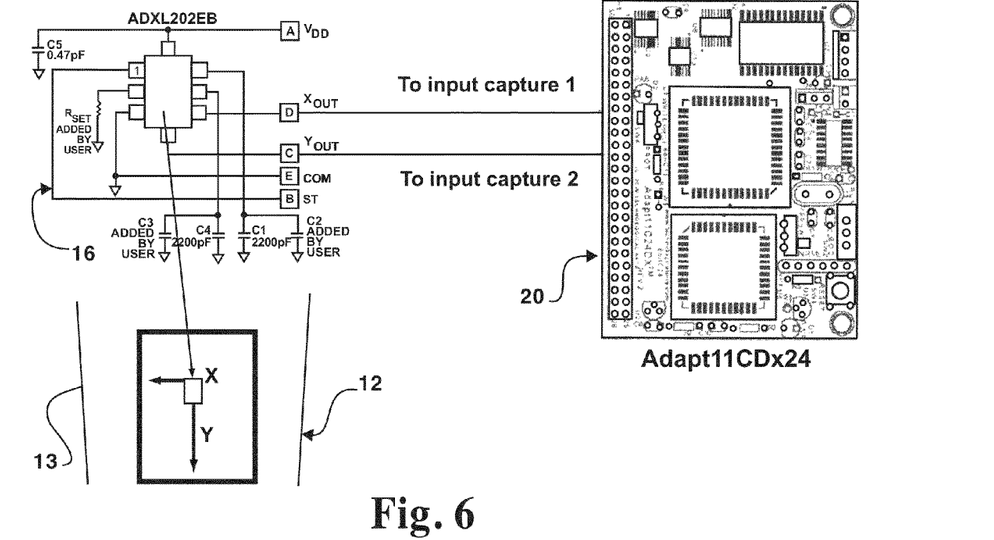
FIG. 6 is a schematic illustration showing how a motion and orientation sensor is connected to a microcontroller according to the present invention.

In FIG. 6, the sensor 16 connects to microcontroller 20 so relative X and Y orientation of the player can be determined. An arrow along the X axis is shown extending away from the front 12 of the player and toward the rear or back 13 of the player (i.e., front of thigh and back of thigh). An arrow along the Y axis is shown extending downward or toward a surface location. The sensor 16 utilized in the prototype of the present invention was an Analog Devices ADXL202EB two-axis accelerometer evaluation board that provides orientation and movement data to be processed by the microcontroller 20. The microcontroller 20 in the prototype of the present invention was a Technological Arts M68HC11 Adapt 11C24DX microcontroller.

Figure 7:
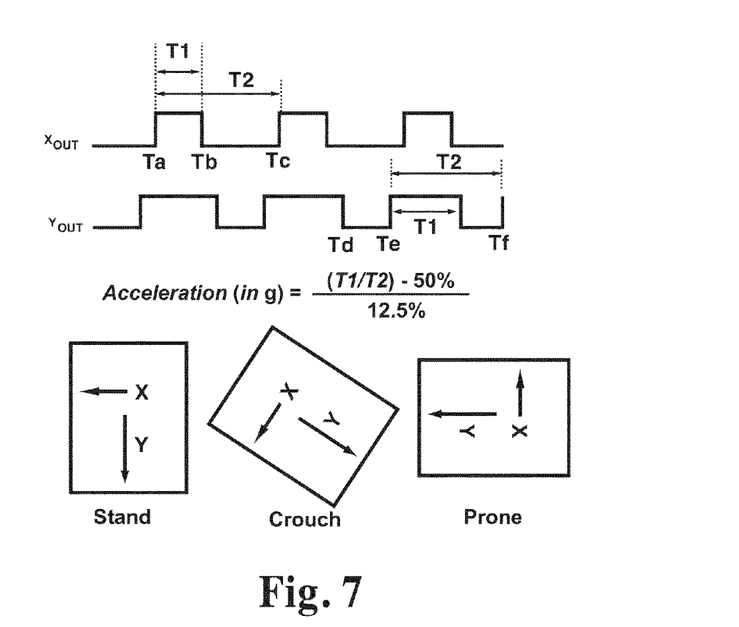
FIG. 7 is a graphical illustration demonstrating how the motion and orientation sensor outputs X and Y pulse widths which are then used to detect various physical positions of the user player.

With reference to FIG. 7, the data obtained from the sensor 16 includes pulse widths along the X and Y axis. The posture of the player is determined by computing the normalized pulse width modulated (PWM) percentages for each axis and comparing the values to known values associated with each position. For example, for a standing position, the X value would be approximately 50 and the Y position would be approximately 38 percent. For a crouch position, both the X and Y values are approximately 42 percent. For a prone position, the X value would be approximately 60 and the Y value would be approximately 50 percent. The use of the normalized PWM values make the program insensitive to microcontroller architecture and speed. The PWM formula is given as (T1/T2)*100%.

Figure 8:
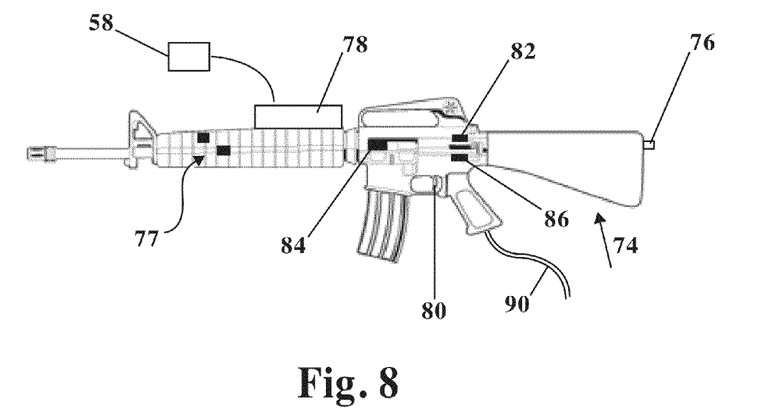
FIG. 8 is a perspective illustration of the game weapon utilized with the present invention.

With reference to FIG. 8, the game weapon or rifle 74 has a zoom sight sensor 76. A two-axis gyroscopic look-aim sensor 78 and direction sensors 77 are mounted on the handguard/grip section of rifle 74. The look-aim sensor 78 wirelessly transmits signals to receiver 58 with direction sensors 77 sending direction signals to a controller, i.e., microcontroller 20. The weapon is further equipped with a trigger or fire switch 80, a fix-jam/SPORTS switch 82, a reload switch 84 and a semi-burst switch 86 which send signals via wire connection 90 to the microcontroller 20. Fire switch 80, fix-jam/SPORTS switch 82, reload switch 84 and semi-burst switch 86 can be categorized as fire-mode switches.

Figure 9:
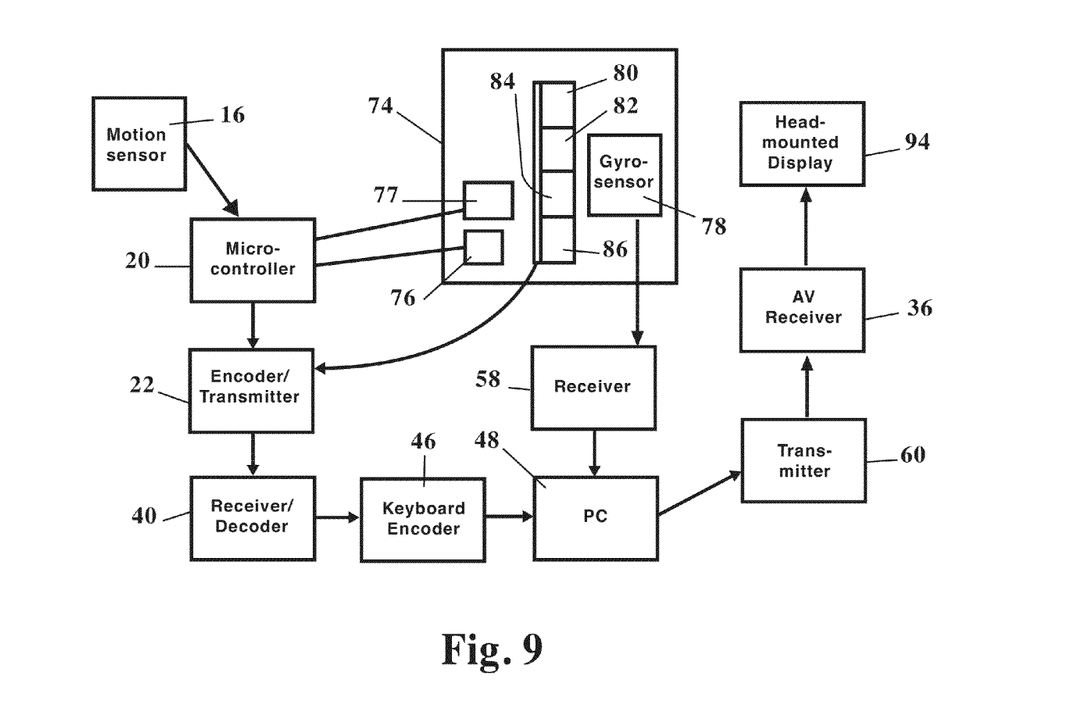
FIG. 9 is a schematic illustration which connects the main components of the present invention.

With reference to FIG. 9, the controller system of the present invention includes a motion sensor, i.e., motion and orientation sensor 16, that outputs signal data relative to respective X and Y acceleration values to microcontroller 20. The movement and orientation sensor 16 is a two-axis accelerometer evaluation board having a vertical axis whose positive direction points toward the ground or floor when the user or player is in the standing position. A horizontal axis is parallel to the vertical axis. The positive direction of the horizontal axis extends rearwardly, i.e., to the rear of the player. The sensor 16 is attached to the side of the thigh of the player 10. The orientation and movement sensor 16 is connected to microcontroller 20 by a signal cable.

Zoom sight sensor 76 and direction sensors 77 of game weapon or rifle 74 connect to microcontroller 20. Microcontroller 20 utilizes custom software whose steps of operation are outlined in FIGS. 11-13. Microcontroller 20 outputs 8 motion and orientation values, (i.e., 8 binary signals), derived from the respective motion and direction sensors 16, 77 along a 8-bit data line to encoder/transmitter 22. Encoder/transmitter 22 has 16 input data lines available and utilizes 8 lines to receive data information from microcontroller 20 and is equipped to receive a fire signal from fire switch 80, a fix jam/SPORTS signal from fix jam /SPORTS switch 82, a reload signal form reload switch 84 and a semi-burst signal from semi-burst switch 86.

The encoder/transmitter 22 converts the received parallel signals to a serial data stream that is wirelessly transmitted to receiver/decoder 40 that decodes the serial data stream so the original parallel signals are sent to keyboard encoder 46 that connects to PC 48. Rifle 74 has a gyroscopic look-aim sensor 78 for detecting the spacial orientation of the game weapon. Sensor 78 is provided with a transmitter that wirelessly transmits a radio frequency signal to receiver 58. Receiver 58 then forwards the received signal to PC 48. PC 48 is connected to transmitter 60 which wirelessly transmits audio and visual signals to head mounted video display 94 through audio visual receiver 36.

Figure 10:
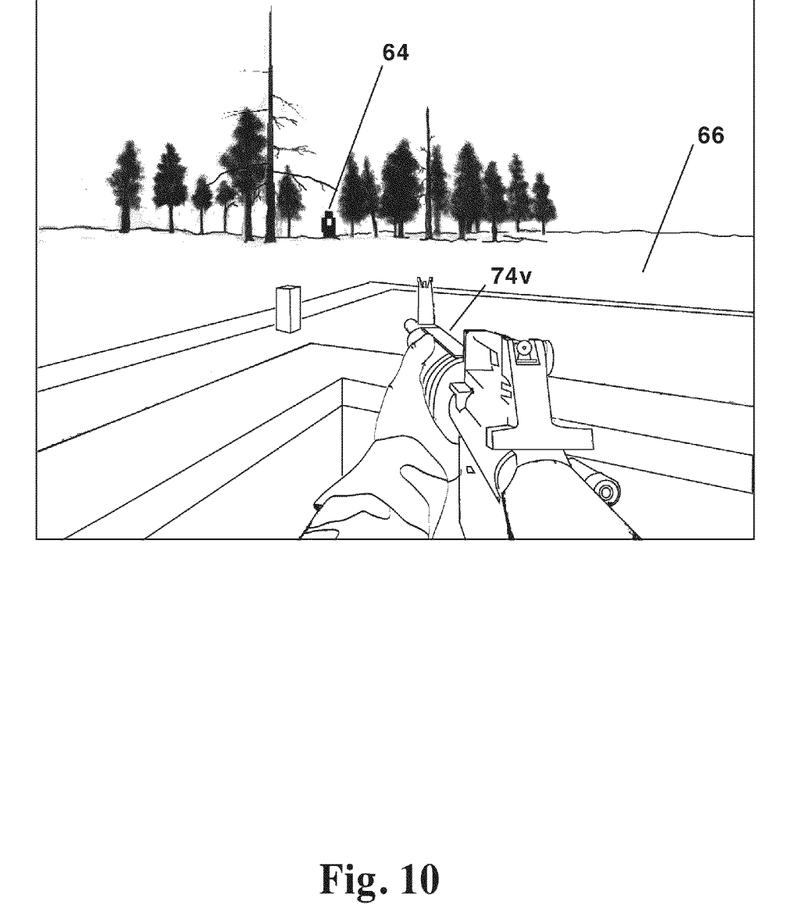
FIG. 10 is a perspective illustration a video environment as seen by a user player utilizing the head mounted video display according to the present invention.

In FIG. 10, a video environment 63 as seen by the player through the head mounted display 94 or video screen demonstrates the perspective of the player when in a crouched position. A video weapon 74V and the video hands of the player are included in the video environment such what the player sees in the video environment replicates what would be seen in a real world situation. The video weapon is pointed at a target 63 positioned on the video terrain 66.

Figure 11:
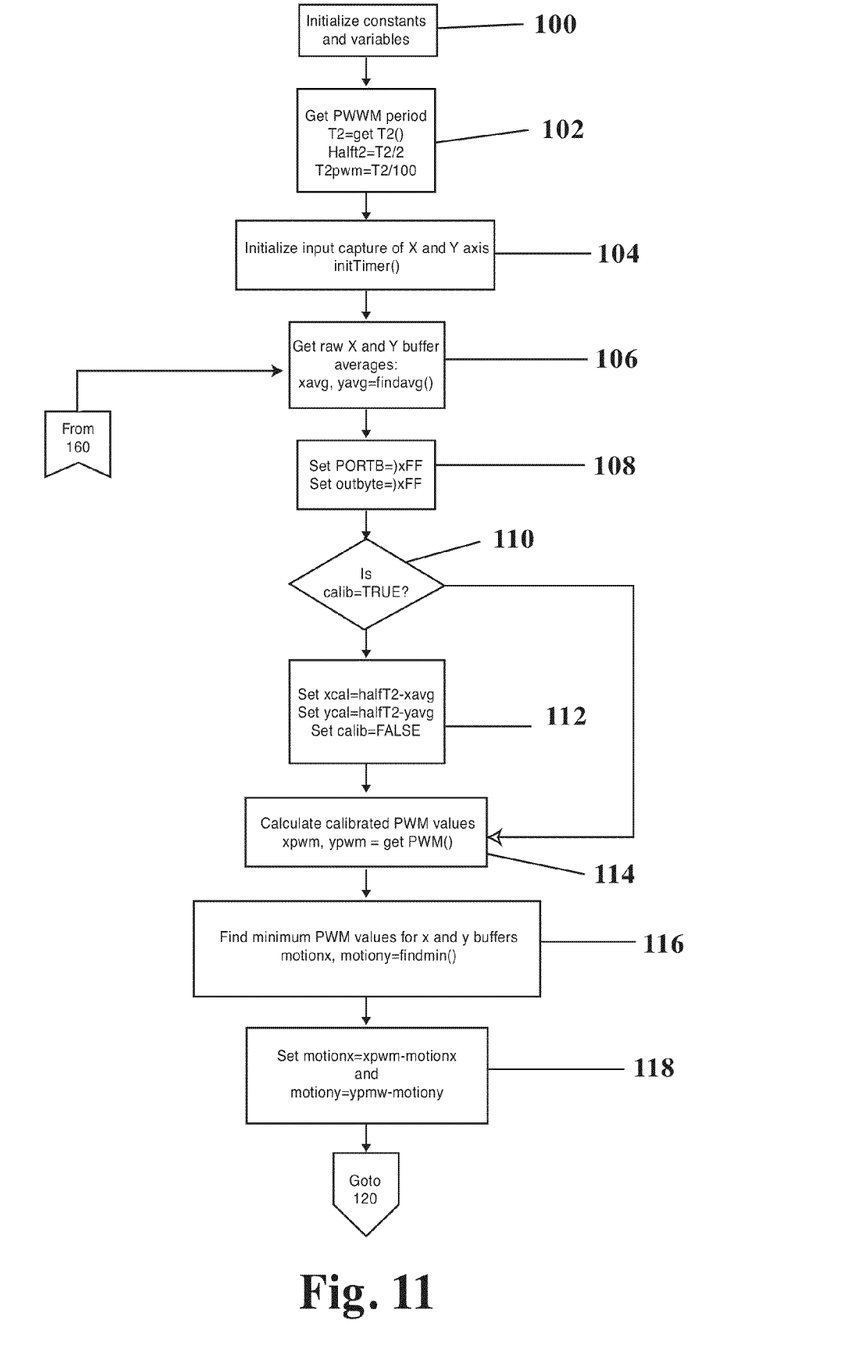
FIGS. 11-13 illustrate a flow chart of steps utilized by the microcontroller before sending data on to an encoder/transmitter according to the present invention.
Figure 12:
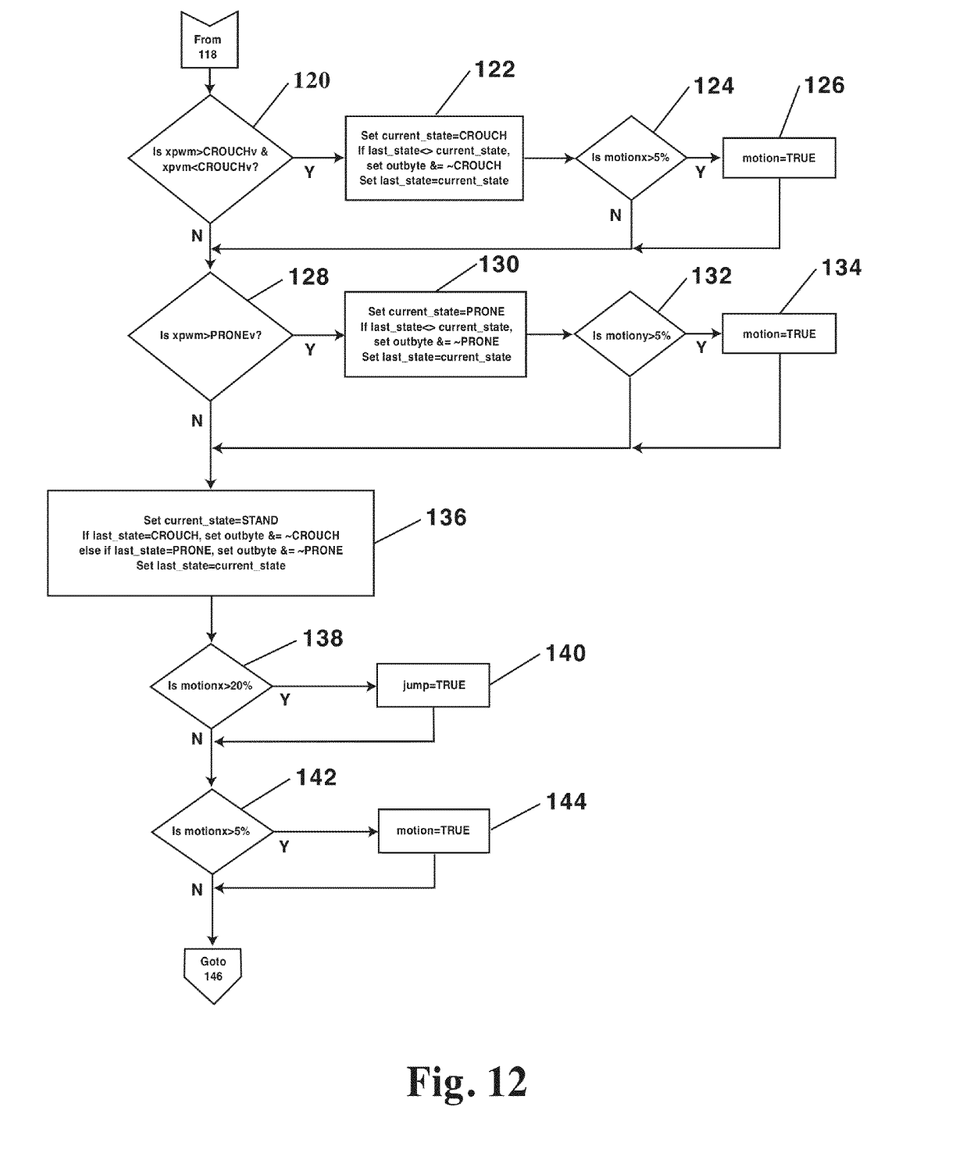
Figure 13:
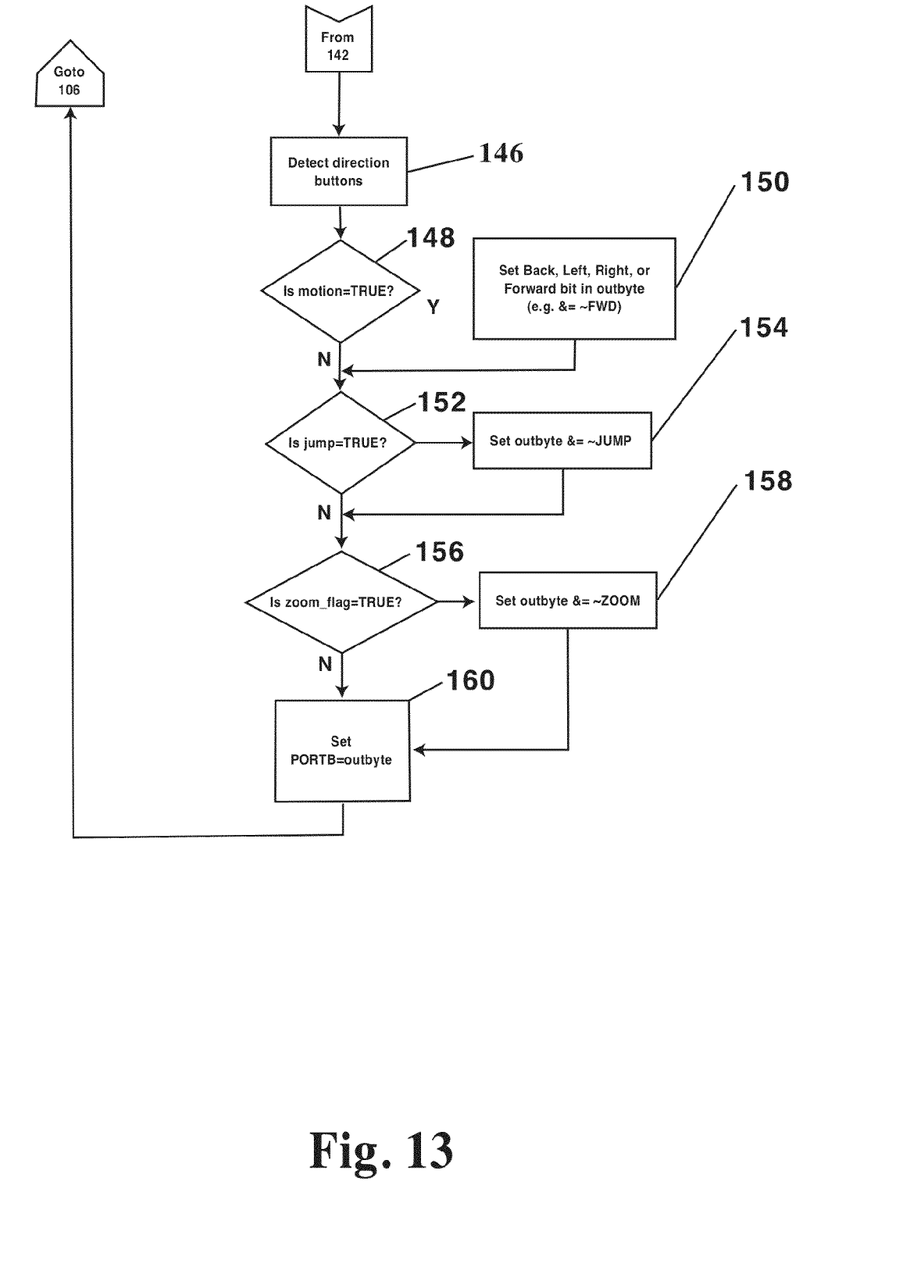

Microcontroller 20 operates from a set of instructions that include the operational steps of FIGS. 11, 12 and 13. In step 100, global variables and constants are defined, (e.g., #define STAND 0x10, unsigned char current_state=STAND). In step 102, a call getT2 ( ) function is performed to store the number of clock cycles in T2 and define a value for halfT2 (theoretically equals 0 g values) and the pulse width modulation (PMW) equivalent (100) T2pwm. In step 104, a Call initTimer ( ) function is used to set register values and flags to capture X and Y accelerometer axis readings and readings from the zoom/sight sensor. In step 106, X and Y circular buffer averages are found, xavg and yavg. The buffer values always contain the most current 64 values for each axis (new sample added every $1/100^{th}$ of a second by interrupt-driven routines getX ( ) and getY ( ).

In step 108, the output port PORTB is reset to 0xFF (all bits on) and the outbyte variable value is reset to 0 xFF. In step 110, the calibration flag calib is checked. If TRUE, the accelerometer needs to be calibrated for 0 g in each axis (this requires the sensor to be flat on the table/floor for approximately 3 seconds after power on). Step 112 determines the error values for the X and Y axis (xcal, ycal) from the theoretical 0 g values (halfT2) to be added to subsequent readings to give a true value. After the calibration is done, the flag is set to false so the routine will not run again. In step 114, a call of the function getPWM ( ) for each axis average obtained in step 106 is made to determine the corresponding PWM values xpwm and ypwm. The returned values are between 0 and 100, where 50 is 0 g. In step 116, a call of the function findmin ( ) for each axis average obtained in step 106 is made to determine the minimum values. This minimum will be assigned to the variables motionx and motiony to determine movement or jumping.

In step 118, the motionx and motiony variables are reassigned to the difference between the average and the smallest values. In step 120, the values xpwm and ypwm are compared to thresholds defined for the crouch position (CROUCHv). If the comparison is TRUE, one proceeds to step 122 to set the state and on to detect motion. If false, one proceeds to step 128. Step 122 sets the current_state variable to CROUCH and checks if the player has changed states (last_state not equal to current_state).

If the result is TRUE, then the CROUCH bit in the outbyte variable is toggled. Finally, set last_state variable equal to current_state variable value. In step 124, if the crouch position is detected, determine if the motionx variable is greater than the threshold FIVEPERCENT. If TRUE, proceed to step 126 to set the motion variable to TRUE.

In step 128, the values xpwm are compared to the threshold defined for the prone position (PRONEv). If the comparison is TRUE, proceed to 130 to set the state and to detect motion. If FALSE, proceed to step 136.

Step 130 sets the current_state variable to PRONE and checks if the player has changed states (last_state not equal to current_state). If that is TRUE, the PRONE bit in the outbyte variable is toggled. Finally, the last_state variable value is set equal to the current_state variable value. In step 132, if the prone position is detected, determine if the motiony variable is greater than the threshold FIVEPERCENT. If TRUE, proceed to 134 to set the motion variable to TRUE. In step 136, the current_state variable is set to STAND. A check is made if the player has changed states (last_state equal to CROUCH or last_state equal to PRONE.) If either is TRUE, toggle the CROUCH or PRONE bit, respectively, in the outbyte variable. Finally, set last_state variable equal to current_state variable value.

In step 138, a determination is made if the motiony variable is greater than the threshold TWENTYPERCENT. If TRUE, then proceed to 140 to set the jump variable to TRUE. In step 142, a determination is made if the motiony variable is greater than the threshold FIVEPERCENT. If TRUE, the motion variable should be set to TRUE in step 144. In step 146, the direction buttons (LEFT, RIGHT, and BACK) are detected. If no button is pushed, the direction is defaulted to FWD.

In step 148, a determination is made confirming whether the value of the motion variable is TRUE. If the motion variable value is true the next step is step 150. If the motion variable value is FALSE, the next step is step 152. In step 150, the corresponding value of the direction of the outbyte variable (LEFT, RIGHT, BACK, or FWD) is toggled. In step 152, a determination is made if the jump variable is TRUE. If TRUE, the next step is step 154. If FALSE, the next step is step 156. In step 154 the JUMP bit is toggled in the outbyte variable.

In step 156, a determination is made whether the zoom variable is TRUE. If TRUE, the next step is step 158. If FALSE, the next step is step 160. In step 158, the ZOOM bit in the outbyte variable is toggled. In step 160, the PORTB value is set to the value of the outbyte variable. Step 160 is the end of the program loop and the process begins again at step 106.

Figure 14:
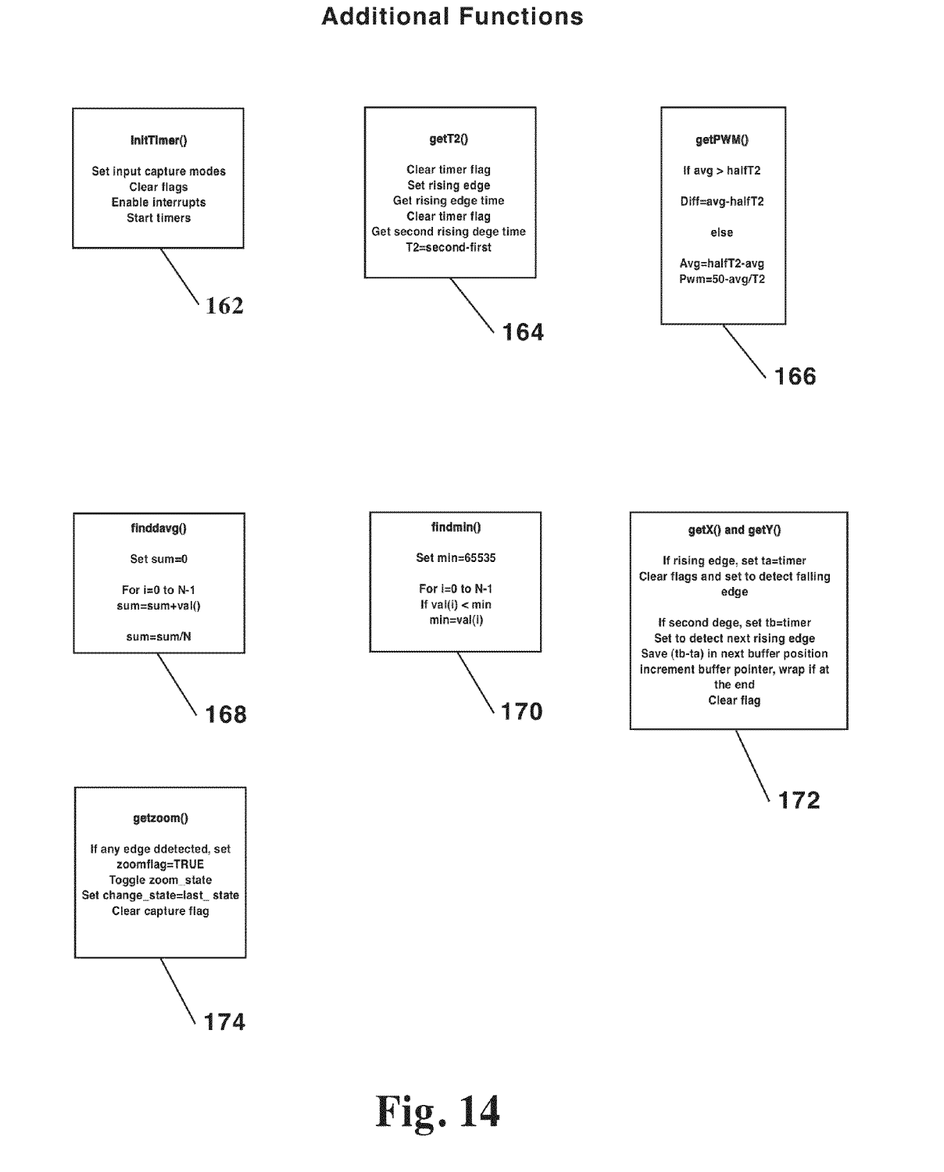
FIG. 14 is a box diagram of functions utilized with the steps of FIGS. 8-11.

Microcontroller 20 also operates from a set of instructions that include the additional functions given in FIG. 14. In step 162, the initTimer ( ) function sets registers and flags to enable input capture of X, Y, and Zoom signals and starts the timer function. In step 164, the getT2 ( ) function detects the pulse width of T2. In step 166, the getPWM ( ) function determines the normalized pulse width modulation (PWM) value T1, given the average value of the X and Y buffers and the T2 value, returning a value between 0 and 100. In step 168, the findavg ( ) function determines the average value of an array of T1 values for the X or Y buffers. In step 170, the findmin ( ) function determines the smallest value in the array of T1 values for the X or Y buffers. In step 172, the getX ( ) and getY ( ) functions are called by the interrupt handler to read an X or Y T1 value. They then store the timer value for the first edge and subtracts it later from the second edge to calculate the width of the PWM signal. Finally, in step 174, the getzoom ( ) function determines any rising or falling edge of the zoom/sights switch and sets a flag to tell the main code to toggle the zoom signal.

The software used in the prototype of the present invention was a C code program that used the input capture capabilities of the 68HC11 and interrupts. However, other software and hardware can be utilized, e.g., Basic Stamp and Basic.

In further elaborating upon the operation of the present invention, the game weapon 74 has a fire switch 80 that allows the weapon to be fired. A reload button 84 or switch provides a reload command so that reloading of the weapon can be simulated. A semi/burst switch 86 allows changes to be made in the method of firing the weapon, e.g., semi-automatic, automatic, etc.

A fix jam/SPORTS switch 82 is provided to detect a command by the user to correct a weapon malfunction. The term "SPORTS" is an acronym for Slap, Pull, Observe, Release, Tap, Squeeze which describes a drill taught in basic rifle marksmanship when the weapon does not fire. The fire switch 80, fix jam/SPORTS switch 82, reload switch 84, and semi/burst switch 86 are all connected to the encoder/transmitter 22.

As previously discussed, game weapon 74 is further provided with a plurality of direction sensors 77 that sense the game player's direction of movement. The direction sensors are connected to the microcontroller 20. The zoom sights sensor 76 of weapon 74 determines the accuracy of a round fired (aiming mode) and connects to the microcontroller 20.

A user may carry the microcontroller 20, data encoder/transmitter 22, power source 30 for the microcontroller 20, audio visual receiver 36 and power source 32 for the head mounted video viewer 94 in the backpack 18. Alternatively, the components can be carried in any other convenient and comfortable apparatus such as a fanny pack or on a belt, etc.

The zoom/sight function tells the game whether to show the standard view of the weapon at "port arms" (weapon at mid-waist level with the buttstock resting under the armpit of the onscreen character (player). In this mode the player can run, jump, etc., but accuracy is diminished. When the player engages the zoom/sights mode, the game screen changes to show the view a player would have if he were looking through the actual sights of the weapon. This view teaches marksmanship and increases the accuracy of the shot. Using a computer keyboard, one toggles the mode on and off by hitting a keystroke. The present invention utilizes logic and some edge detection to realistically bring up the sights when the rifle is against the armpit and lowers when it is released.

As related, the weapon sensor system has the fire switch 80, reload switch 84, semi/burst switch 86, and the fix jam/SPORT switch 82. All commands from switches 80, 82, 84, and 86 connect directly to the data encoder/transmitter 22.

The commands received by the data encoder/transmitter are then sent to the keyboard encoder and directly decoded into the appropriate key scan codes. Transmissions from the zoom/sights sensor 76 are decoded by the microcontroller to provide a state history of the zoom/sight function, i.e., the game is commanded to display the correct aiming mode of the on-screen weapon such the sights appear in the game when the buttstock of the weapon model is brought to the shoulder of the user in a natural aiming manner.

When the weapon is lowered to a natural carrying position, the microcontroller detects the change in state of the zoom/sights sensor and generates a toggle sights pulse, which is communicated to the data encode/transmitter and is transmitted wirelessly to the data decoder receiver. The command causes the on-screen weapon sights to be removed. The generation of the toggle sights pulse is applicable to all commands.

The fire switch, reload switch, semi/burst switch and the fix jam/SPORTS switch are directly connected to the data encoder/transmitter via a multi-conductor cable. In this way, the output of these switches 80, 82, 84 and 86 are transmitted via wire to the data encoder/transmitter 22, and on, wirelessly, to the data decoder/receiver 40, which are then passed on to the keyboard encoder 46.

The direction sensors 77 and the zoom/sights sensor are in direct communication with the microcontroller 20. The microcontroller performs algorithmic operations on the signals from these sensors and transmits new commands directly to the data encoder/transmitter. The data encoder/transmitter then communicates these commands wirelessly to the data decoder/receiver 40 which are then passed on to the keyboard encoder 46.

In a preferred embodiment, all commands received by the data encoder/transmitter are sent wirelessly to the data decoder/receiver 40, and on directly to the keyboard encoder 46 to be converted to standard keyboard scan codes that are interpreted by the game as normal alphanumeric keystrokes.

Alternatively, all command signals received from switches 80, 82, 84, 86 along with the commands derived from the zoom/sight sensor 76 and the orientation motion sensor 16 via the microcontroller can be received directly by the keyboard encoder. The resulting output keyboard scan code signal can then be encoded and transmitted wirelessly to a corresponding receiving and decoding means, and on directly, to the personal computer 48 (through its PS/2 keyboard input).

A player visual system includes a head mounted video display 94, an audio/visual receiver 36 in communication with the head mounted display, and an audio visual sender 60 in communication with the game PC. The audio visual receiver and the audio visual sender have a wireless communication means that enables the audio/visual sender to wirelessly communicate the game graphics and data to the head mounted video display via the audio/visual receiver so that the user can see and hear what is happening in the video environment.

In operation, an activation switch is provided on the game weapon 74 to activate or deactivate a wireless transmission of the two-axis gyroscopic look/aim sensor 78. A receiver to the game PC via a PS/2 mouse connector or USB generates standard mouse signals. The two-axis gyroscopic look/aim sensor is a commercially available sensor/transmitter/receiver set, such as a wireless computer mouse.

The orientation and movement sensor 16 consists of a two-axis accelerometer evaluation board, such as Analog Devices ADXL202EB to detect static and dynamic acceleration of the player with respect to ground. The board is mounted with one axis pointing downward and the other axis pointing rearward parallel to ground when the user is standing upright. The board is mounted in a plastic enclosure that attaches to the outer seam of the user's pants or trousers at the thigh level. A four conductor cable provides 5V dc, ground, and the X and Y signals to the microcontroller 20.

Figure 5:
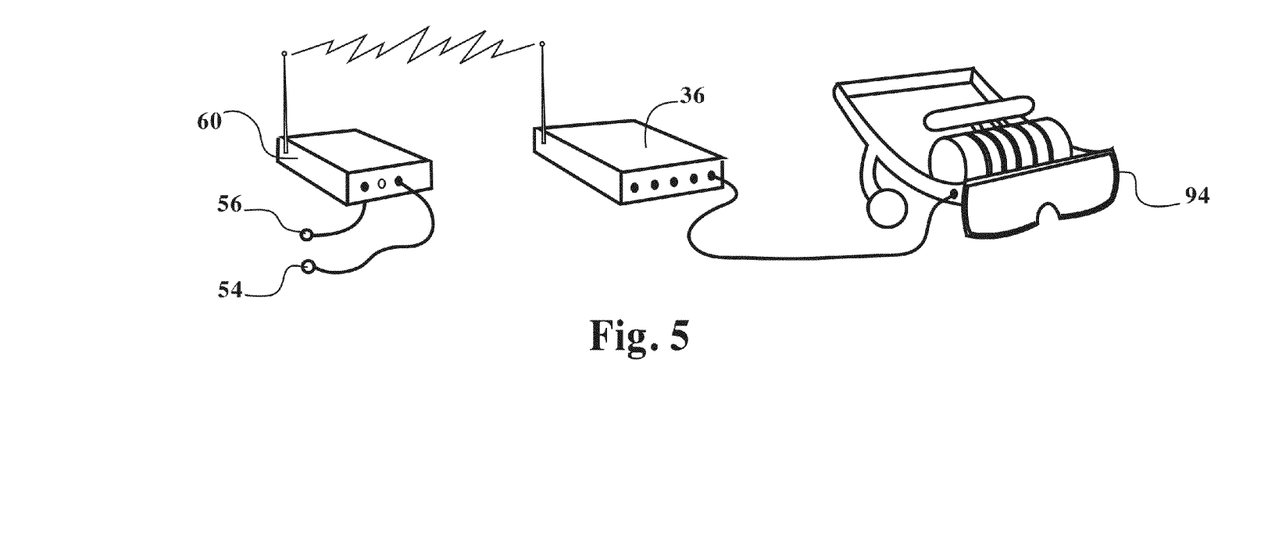
FIG. 5 is a perspective illustration showing the transmitter and receiver that are used in conjunction with a head mounted video display mechanism.

The game audio and video (AV) is sent to the user game player via a commercially available 2.4 GHz A/V transmitter 60, The transmitter combines a composite NTSC video from the computer video card and line-level stereo audio from the sound card. The transmitter 36 transmits these A/V signals to matching receiver 36 which is connected to the head mounted video display 94. Thus, the user player receives the same audio and video that would be displayed on the computer monitor and heard from the monitor speakers.

The microcontroller used in the prototype of the present invention is a commercially available Technological Arts M68HC11 Adapt 11C24DX controller. The data encoder/transmission module and receiver/decoder module used in the prototype of the present invention were commercially available Glolab GL116 TMV1 and RMV1 modules, respectively.

With a player wearing the microcontroller, the data encoder/transmitter is able to receive and read the direction signals from direction sensors 77, the zoom/sights sensor 76, and the motion and orientation sensor 16. The accelerometer (sensor 16) X and Y signals and zoom/sights signals are transmitted to the microcontroller input capture pins (Port A IC1, IC2, and IC3). The back, left and right switches are connected to a generic digital input port (Port C PC2, PC3, and PC4).

The microcontroller executes an algorithmic code that confirms and replicates the posture and motion of the user by outputting a 8-bit parallel digital signal to the encoder from Port B (PB0-PB7). These signals connect to the encoder 24 TTL-level inputs. The encoder creates a coded serial data stream output that is then connected to the serial stream input of the transmitter and modulates a radio frequency (RF) carrier at and unlicensed ISM band of 418 MHz.

The microcontroller receives pulse-width modulated X and Y axis signals from the sensor 16 at the rate of 100 pulses per second and computes the width of each of these signals between rising and falling edges. T1 is computed as being the time between a rise and fall in the respective X and Y output signals and T2 being the time between rises in the respective X and Y output signals. These two values are accumulated into two 64 element buffers and averaged and compared to thresholds to determine the user's posture with respect to the earth's gravity.

Additionally, the maximum and minimum values of each of the axis buffers is compared to determine if there is dynamic motion. If the one or both of the extrema exceeds a threshold, motion is detected. The microcontroller uses the direction sensors 77 in conjunction with the motion decision to determine if the user is moving forward (the default with no button pushed), backwards, strafe left, or strafe right.

The receiver/data decoder module 40 receives a modulated serial data stream via a matching receiver 42 from the transmitter 26 of encoder/transmitter 22. The receiver 42 of receiver/decoder 40 then sends the modulated data stream on to its decoder 44 which demodulates and separates the serial data stream into a 16 bit parallel TTL-level signal. The parallel signal is connected to TTL-level logic inverters of the keyboard encoder 46. The keyboard encoder of the prototype of the present invention was a commercially available Hagstrom KE18. The logic inverters provide a grounded output when the input is a 5V dc signal. The keyboard encoder generates a PC-compatible keyboard scan code based on which of the 18 input pairs are electrically shorted. The output of the keyboard encoder is connected to the PS/2 keyboard input of the game computer 48.

The motion and posture sensing capabilities of the present invention are novel among devices in existence today. Current training simulators rely on the user to navigate the virtual world by the use of a joystick device to move about. Such a mechanism does not provide the realism of physical exertion that a true body motion sensor provides. In the present invention use of a player's natural body motion and orientation control the on-screen character. For example, a player may wish to lie in a prone position so that he achieves a concealed position in the game to avoid detection.

Additionally, the player may need to move while in the prone position which movement is known as "low crawling".

With the present invention, the player's actual physical movement can be expressed on the video screen. If a prone position is desired, the player would lie in the prone position with crawling being replicated by the player moving his limbs, the equivalent of running in place. If a crouched position was desired by the player, he would simply crouch or take a knee.

The present invention allows the game to sense the body posture and motion of the user. The user is completely untethered from the game computer and has complete 3-D freedom within a thirty foot radius of the game computer. This provides a realistic physical dimension to a video game system which can be used for realistic military and law enforcement training or commercial game playing applications. Additionally, the present invention does not require extensive or exotic computing resources as it is perfectly operational with a conventional PC interface and requires only standard keyboard and mouse connectors.

Various modifications are possible without deviating from the spirit of the present invention. Accordingly, the scope of the invention is defined by the claims which follow hereafter.

What is claimed is:

1. A video control system, comprising:
   a two-axis accelerometer worn by a video game player;
   a microcontroller connected to said two-axis accelerometer, receiving data transmitted by the two-axis accelerometer comprising pulse widths along a X-axis and a Y-Axis, said microcontroller determining a presently occurring posture position of said video game player by computing a normalized pulse width modulated percentage value of the X-axis and computing a normalized pulse width modulated percentage value of the Y-axis, without need of Z-axis percentage values, and comparing the normalized pulse width percentage values of the X-axis and Y-axis with known values for various posture positions so as to determine the presently occurring posture position of the video game player and generating posture control signals;
   a game weapon having a plurality of direction sensors, said direction sensors sending direction signals indicative of the video game player's direction of movement to said microcontroller;
   an encoder connected to the microcontroller, said microcontroller sending said posture control signals in parallel with said direction signals to said encoder, said encoder converting said posture control signals and said direction signals so as to comprise a serial data stream;
   a transmitter connected to said encoder, said transmitter transmitting said serial data stream;
   a receiver, said receiver receiving said serial data stream from said transmitter;
   a decoder for decoding the serial data stream signals received by the receiver into decoded parallel signals;
   a keyboard encoder for receiving said decoded parallel signals from said decoder;
   a computer having a keyboard port, said keyboard port being connected to said keyboard encoder; and
   a viewing screen connected to said computer; and wherein the presently occurring posture position of the video game player is replicated in a video environment portrayed on the viewing screen such that the viewing screen displays the video environment from a perspective corresponding to the actual physical posture of the video game player .

2. A video control system according to claim 1, further comprising: a zoom sight sensor mounted on the game weapon, said zoom sight sensors being in direct communication with said microcontroller; and a look aim sensor mounted on said game weapon, said look aim sensor wirelessly transmitting look-aim data to a second receiver, said second receiver. connecting to a mouse port of said computer.

3. A video control system according to claim 2, further comprising: an audio visual transmitter connected to a video card and a sound card of said computer, said audio visual transmitter wirelessly transmitting to an audio visual receiver said audio visual receiver connecting to said viewing screen which is a head mounted display.

4. A video control system according to claim 3, wherein:
said audio visual receiver, said microcontroller, said encoder and said transmitter are positioned within a backpack adapted for wear by said video game player.

* * * * *